United States Patent Office 3,553,636
Patented Jan. 5, 1971

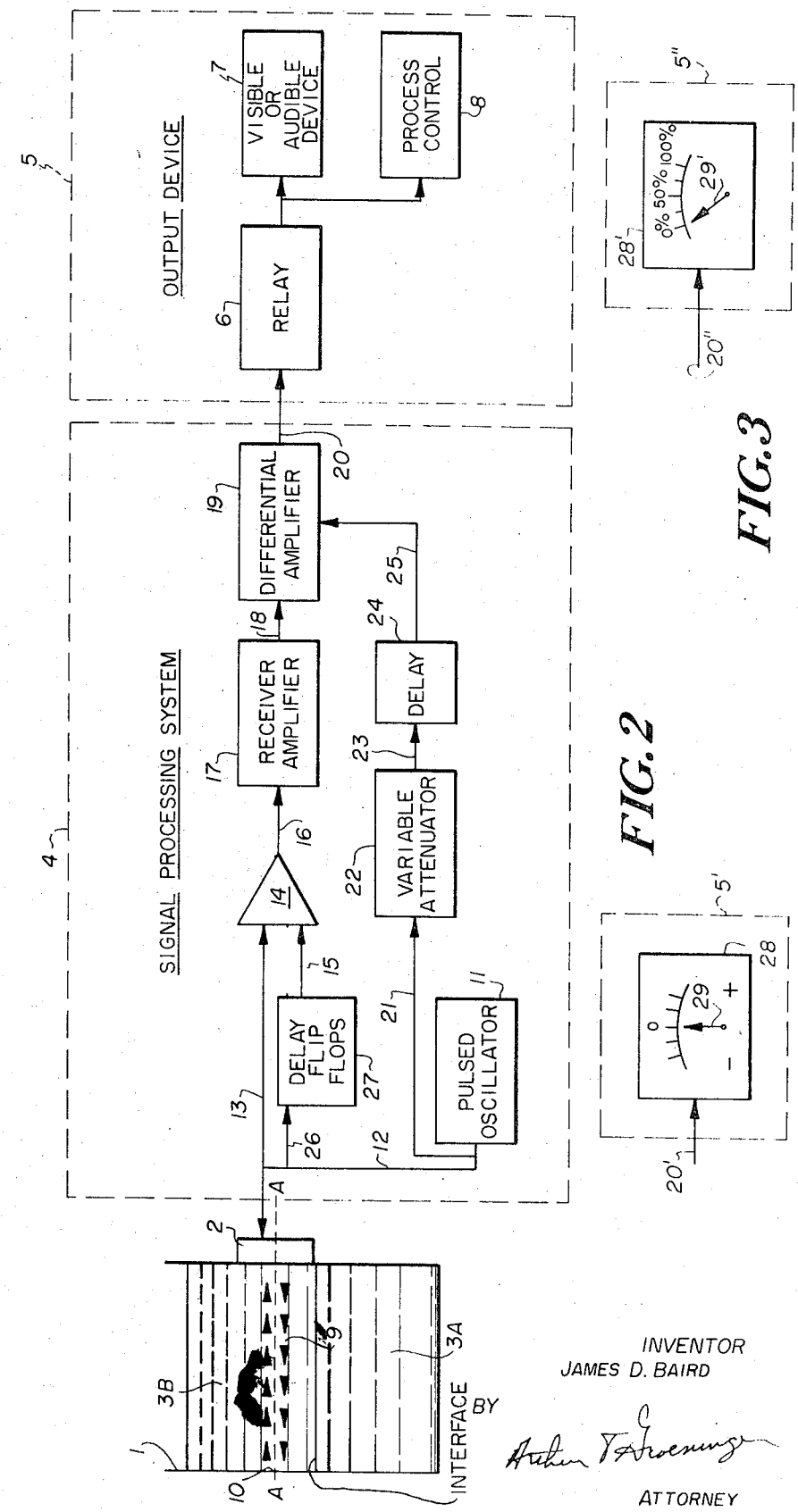

3,553,636
NONCONTACT ULTRASONIC INTERFACE VISCOSITY AND PERCENT SOLID DETECTING DEVICE
James D. Baird, Hauppauge, N.Y., assignor, by mesne assignments, to The Bin-Dicator Company, Detroit, Mich., a corporation of Michigan
Filed Jan. 27, 1969, Ser. No. 794,105
Int. Cl. G01s 9/66
U.S. Cl. 340—1  9 Claims

ABSTRACT OF THE DISCLOSURE

An interface, viscosity and percent suspended solid ultrasonic detecting system comprising a transducer adapted to be affixed to the outside of a container wall, means for energizing the transducer so that an ultrasonic pulse is transmitted through the container wall, across the container contents, and reflected off the opposite container wall back to the transducer, and means responsive to the reflected pulse, and dependent on the extent of attenuation of the reflected pulse, for indicating the location of an interface between two stratified immiscible liquids in the container and/or for indicating the viscosity and/or the percent solids of a suspension in a container.

BACKGROUND OF THE INVENTION

Heretofore, ultrasonic devices have been proposed for indicating an interface between stratified immiscible liquids in a container. One method proposed may be referred to as the ultrasonic echo method wherein a transducer is placed in the bottom of the container for directing a beam of ultrasonic vibrations toward the liquid/liquid interface. Such a device is shown and described in U.S. Pat. 2,775,748 to Rod et al., which issued Dec. 25, 1956. The elapsed time between the transmission and reception of the ultrasonic pulse, and the known velocity of the pulse in the traversed medium, gives the distance traveled by the pulse, and thus determines the interface level with respect to the transducer.

Ultrasonic devices have also been proposed to measure liquid viscosity and percent of suspended solid. All these devices have also required process liquid contact to the sound emitting face of the transducer.

In any of the prior art devices, many problems result, particularly in installation and maintenance. Material buildup on the tarnsducer, flow, corrosion, abrasion, temperature and pressure requirements of the general process industry, severely limit the use of such process liquid contacting devices. Errors also arise from variation in the speed of propagation of sound with changes in temperature and density of the liquid in the container. Further error arises due to inaccuracy inherent in echo sound apparatus when the distances involved are relatively small, as in the case with containers of practical size.

BRIEF SUMMARY OF THE PRESENT INVENTION

The present invention provides a liquid/liquid interface, viscosity and percent suspended solid ultrasonic detecting system in which the transducer is mounted out of contact with the process liquid. The transducer is adapted to be mounted on the outside of a container wall and is therefore not affected by the process conditions.

The system includes comparison means for detecting the extent of attenuation of an ultrasonic pulse which is transmitted through the container wall, across the internal dimension of the container and reflected off the container wall back to the transducer. The use of comparison techniques provides highly accurate measurement allowing for detection of small differences in attenuation and allows for providing an easily adjustable standard comparison voltage so that the system can be readily adjusted to accommodate different process liquids and/or suspensions.

DRAWINGS

FIG. 1 is a schematic and block diagram of the present invention.

FIG. 2 shows a modified output device of the present invention.

FIG. 3 shows a further modification of the output device of the present invention.

DETAILED DESCRIPTION

Liquid/liquid interface detection

Referring to FIG. 1, a container 1 is provided having a transducer 2 mounted thereon. Container 1 contains two stratified immiscible liquids 3A and 3B having different viscosities.

A signal processing system 4 is provided for energizing transducer 2 and for processing signals received therefrom.

When the liquid/liquid interface between liquids 3A and 3B is below the transducer level indicated by line A—A in container 1, the signal processing system 4 is adapted to selectively energize output device 5. Output device 5 includes relay 6 which functions to switch on visible or an audible signaling device 7 and/or a process control device 8. Device 7 may comprise a horn, buzzer, flashing lights or any other conventional visible and/or audible alarm or device or any combinations of such devices. Device 8 may comprise a pump, valve, or the like.

Transducer 2 may comprise any conventional ultrasonic pulse transmitting-receiving transducer, preferably, but not limited to a piezoelectric device in the form of a disc which is cemented, clamped, held or otherwise affixed to the outer wall surface of container 1.

When energized, transducer 2 transmits an ultrasonic pulse across the container at a level indicated by line A—A passing through the container wall, taking the path indicated by arrows 9 across the internal dimension of the container. The pulse is reflected off of the opposite container wall at 10 and returned to transducer 2. If wall 10 is blocked by plumbing or the like, a reflecting wall (not shown) may be provided in the container 1.

Signal processing system 4 includes a pulsed oscillator 11, which may be of any conventional design, for producing signals on line 12 at a suitable repetition rate. Each of these signals is applied by leads 12 and 13 to transducer 2 where the signals are converted to corresponding ultrasonic pulses.

Upon return of the reflected pulse to the transducer 2, the pulse is transformed to an electrical pulse diminished in magnitude according to the material through which the pulse passed in the container 1. The greater the viscosity of the material, the greater the attenuation of the pulse passing therethrough. This pulse is applied by lead 13 to a two input "and" gate 14 at a first input thereof, the second input receiving a check signal on lead 15, the purpose of which will be hereinafter more particularly described.

The output of "and" gate 14 is applied by lead 16 to receiver amplifier 17 to provide an output signal having an attenuated magnitude dependent on the viscosity of the particular liquid 3A or 3B, through which the ultrasonic pulse passed. The output of receiver amplifier 17 is applied by lead 18 to the first input of differential amplifier 19. Differential amplifier 19 also has applied at a second input, a standard voltage level equal in magnitude to the magnitude of the reflected pulse passing through the bottom liquid 3A.

When liquid 3A is at the transducer level A-A so that the ultrasonic pulses pass through liquid 3A, differential amplifier 19 provides no output. When top liquid 3B is at the level A—A so that the sonic pulses pass therethrough, the reflected pulse will be attenuated to a different extent and differential amplifier 19 provides an output signal thereby indicating that the liquid/liquid interface is below level A—A. This output signal is applied by lead 20 to relay 6 which functions to switch on indication device 7 and/or process control device 8.

It is to be understood that the system may be calibrated to detect when the liquid/liquid interface is above level A—A by adjusting the standard voltage to correspond to a reflected pulse passing through top liquid 3B. In this case, differential amplifier would provide an output signal when bottom liquid 3A is at level A—A thereby detecting that the liquid/liquid interface is above level A—A.

The standard voltage level is conveniently generated by using pulsed oscillator 11. The output of pulsed oscillator 11 is fed via lead 21 to variable attenuator 22. The variable attenuator 22 permits an adjustment of the pulse level to a selected standard level calibrated at the point of installation to correspond to the electrical pulse developed in response to an ultrasonic pulse passed across and back through liquid 3A or 3B in container 1. The output of the variable attenuator 22 is fed via lead 23 to delay 24 and lead 25 to the differential amplifier 19. The delay 24 insures that the standard level voltage will be available at the time that the receiver amplifier 17 output is produced.

As hereinbefore described, a check signal is applied by lead 15 to "and" gate 14. This check signal is applied only after an elapsed time approximately equal to that required for the electrical and acoustical pulses to traverse the path from the pulsed oscillator 11, across leads 12 and 13 to transducer 2, the path across container 1 in both directions, and lead 13 to "and" gate 14. The check signal is applied for a sufficient length of time to accommodate minor variations in the transit time of these pulses. At all other times, "and" gate 14 is blocked due to the absence of the check signal. In this manner, the pulse transmitted to transducer 2 together with other spurious signals arising in the system are not transmitted to differential amplifier 19 to possibly activate device 7 or 8.

The check signal is generated by applying the output of oscillator 11 by leads 12 and 26 to the input of delay flip flops 27. Delay flip flops 27 will delay its response to the input signal for a period of time corresponding to the period of time required for the electrical and acoustical pulse to traverse the paths hereinbefore described.

Referring to FIG. 2, a modified output device 5' is shown as an alternative output device 5 of FIG. 1. In this embodiment, the output from differential amplifier 19 may be fed by conductor 20' to voltage meter 28 having a pointer 29. In this instance, variable attenuator 22 is adjusted so that the differential amplifier 19 has balanced inputs when the interface between liquids 3A and 3B is at level A—A. Under this condition, pointer 29 provides a zero reading as shown.

When the higher viscosity liquid is at level A—A, the reflected pulse is attenuated to a greater extent thereby causing a negative read out on the meter 28 with pointer 29 moving counter clockwise. When the liquid/liquid interface is in the area of transducer 2, the extent of displacement of the interface from level A—A will be indicated by the magnitude of the read out.

When the lower viscosity material is at level A—A, the reflected pulse is attenuated to a lesser extent thereby causing positive read out on meter 28 with pointer 29 moving clockwise. The extent of displacement from transducer level is again reflected by the magnitude of the positive read out.

If materials different from materials 3A and 3B are in container 1, the reflected pulse will be attenuated to a different extent. This change, however, can be readily accommodated by adjustment of variable attenuator 22.

Percent solid and/or viscosity indication

The system of the present invention can also be used to provide an indication of liquid viscosity and/or of the percent solids of a suspension (not shown) contained in a container. The greater the viscosity and/or percent suspended solids, the greater the attenuation of the reflected pulse.

In determining percent suspended solid, the signal processing system 4 of FIG. 1 may be used except in this instance the selected standard voltage for input to differential amplifier 19 is adjusted to correspond with a zero or a reference percent solid indication. The selected voltage is made equivalent to a pulse developed in response to an ultrasonic pulse passed through a liquid free of or having a known value of suspended particles. The output from differential amplifier 19 will then have an output varying in magnitude as the percent solids in suspension varies.

In percent solid determination, the output from signal processing system 4 is applied to a modified indicator device 5" shown in FIG. 3. Indicator device 5" includes a meter 28' having a pointer 29'. Assuming the selected standard voltage is adjusted to correspond with a zero percent solid indicator 1, then when the output from differential amplifier 19 is at a null, the pointer 29' is at a zero percent reading as shown. As the percent solid increases, the inputs to differential amplifier become more and more unbalanced as the pulses transmitted through the container are attenuated to a greater extent as the percent solid increases. This in turn causes the output from differential amplifier 19 to increase and, in response thereto, pointer 29' moves clockwise to provide a visual indication of the percent solid in the container. Suitable indicia of indication percentages is provided on meter 28'.

In determining viscosity, the signal processing system 4 of FIG. 1 may again be used except in this instance the selected standard voltage for input to differential amplifier 19 is adjusted to correspond with a reference viscosity indication. The selected voltage is made equivalent to a pulse developed in response to an ultrasonic pulse passed through a liquid of known viscosity selected as a reference. The output from differential amplifier 19 will then have an output varying in magnitude as the viscosity varies.

In viscosity determination, the output from signal processing system 4 is applied to a meter of the type shown in FIGS. 2 and 3 except that the indicia is viscosity indicia and the pointer is adjusted to indicate the reference viscosity when the output from differential amplifier is at a null.

While the present invention has particular application for detecting liquid/liquid interface and for detecting viscosity and percent solids in suspension, the present invention also has the capability of indicating the presence or absence of a liquid at a selected level in a container in cases where there is no liquid/liquid interface and only a liquid/air interface. In this case, the ultrasonic pulse is transmitted either through the air or the liquid. When passing through air, the pulse is substantially completely attenuated. Only when the pulse is transmitted through the liquid will a reflected pulse produce an output signal for processing system 4. Variable attenuator 22 and delay 24 may be eliminated when such use is made of the system because the large differences in attenuation between liquid and air do not require the use of comparison techniques. Accordingly, when a signal is transmitted through differential amplifier 19 so as to energize relay 6 and indicator 7, an indication is made that liquid has been detected above level A—A.

All elements in FIGS. 1, 2 and 3 are well known in the art and will not be described for the sake of brevity.

Although only one embodiment of the invention has been illustrated and described in detail, it is to be expressly understood that the invention is not limited thereto. Various changes can be made in the design and arrangement of the parts without departing from the spirit and scope of the invention.

I claim:

1. A noncontact ultrasonic liquid detection system for detecting changes in the ultrasonic attenuation characteristic of a liquid indicative of changes in such physical characteristics as the viscosity, percent solids and/or interface level condition of the liquid when contained in a vessel, said system comprising a vessel adapted to contain a quantity of the liquid and having a first wall defined by an interior surface in contact with the liquid and an exterior surface out of contact with the liquid juxtaposed to said interior surface, means for generating electrical signals of an ultrasonic frequency, ultrasonic transducer means operably connected to said generating means and secured to said exterior surface of said first wall in noncontacting relationship with liquid in said vessel, said transducer means being oriented to transmit an ultrasonic pulse in response to application of said signals thereto in a path through said first wall and through said interior surface thereof and across at least a portion of the interior liquid-filled space of said vessel, wall means having a pulse reflecting surface in said space in contact with the liquid and being oriented to reflect said pulse back to said transducer via said path, said transducer means being responsive to the reflected pulse to generate an electrical echo signal having a characteristic dependent upon the extent of attenuation of said pulse while transmitting said path from said transducer to said reflecting surface and back to said transducer, and means for comparing said echo signal with a selected standard electrical signal related to a reference pulse attenuation value characteristic of a standard condition of the liquid to thereby produce a measure of the change in the condition of the liquid from said standard condition.

2. The system as set forth in claim 1 wherein said vessel and transducer means are oriented relative to one another such that said ultrasonic signal path is generally horizontal and hence generally parallel to any gravity-induced liquid-to-liquid interface conditions occurring in said liquid.

3. The system as set forth in claim 1 wherein said transducer means comprises a piezoelectric device having an active element affixed to said exterior surface of said first wall with its pulse propogation axis perpendicular to said reflecting surface.

4. The system as set forth in claim 1 wherein said interior and exterior surfaces of said first wall and said reflecting surface are parallel to one another and said transducer means is oriented with its pulse propogation axis substantially perpendicular to said surfaces.

5. The system as set forth in claim 4 wherein said vessel has a second wall juxtaposed to said first wall with an interior surface defining said reflecting surface and containing the liquid therebetween.

6. The system as set forth in claim 5 wherein said vessel and said transducer means are oriented relative to one another such that said path does not traverse any liquid/liquid and/or liquid-gas interfaces formed by the liquid in the vessel and such that only the transducer-first wall interface at said exterior surface, the first wall-liquid interface at said interior surface of said first wall and the liquid-second wall interface at said reflecting surface are disposed transverse to said path.

7. The system as set forth in claim 1 wherein said comparison means comprises variable attenuator means operably connected to said signal generating means for converting signals received from said generating means to the selected standard signal, and means operably connected to said variable attenuator means for combining said echo signal and said standard signal to produce an output signal representative of the difference in a given characteristic of said echo and said standard signal.

8. The system as set forth in claim 7 wherein said vessel comprises a conduit containing a column of a liquid extending between and transverse to said pulse path.

9. The system as set forth in claim 7 wherein said vessel has oppositely disposed generally vertical side walls having interior surfaces forming respectively said first wall interior surface and said reflecting surface, said transducer means having a transmitting and receiving pulse path surface area extending vertically adjacent said exterior surface of said first wall above and below a selected level, said vessel containing at least two stratified fluids having different ultrasonic attenuation characteristics and defining a horizontal interface therebetween, said comparison means being operable to produce an output signal having a magnitude and polarity dependent upon whether said interface is above or below said selected level and the extent said interface is spaced vertically therefrom in said area of said transducer means.

References Cited

UNITED STATES PATENTS

| 2,960,678 | 11/1960 | Beard et al. | 340—1 |
| 2,990,543 | 6/1961 | Rod | 340—244 |
| 3,133,445 | 5/1964 | Richard | 73—432 |
| 3,184,969 | 5/1965 | Bolton | 73—290 |
| 3,407,398 | 10/1968 | Stearn | 340—244 |

FOREIGN PATENTS

| 873,538 | 7/1961 | Great Britain | 340—1 |

RICHARD A. FARLEY, Primary Examiner

U.S. Cl. X.R.

340—3, 244; 181—0.5; 73—54, 61, 290